United States Patent
Savchenkov et al.

(10) Patent No.: US 6,987,914 B2
(45) Date of Patent: Jan. 17, 2006

(54) OPTICAL FILTER HAVING COUPLED WHISPERING-GALLERY-MODE RESONATORS

(75) Inventors: Anatoliy Savchenkov, La Crescenta, CA (US); Vladimir Ilchenko, La Canada, CA (US); Lutfollah Maleki, Pasadena, CA (US); Timothy A. Handley, Santa Barbara, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/702,201

(22) Filed: Nov. 4, 2003

(65) Prior Publication Data

US 2004/0240781 A1 Dec. 2, 2004

Related U.S. Application Data

(63) Continuation-in-part of application No. 10/441,946, filed on May 19, 2003, now Pat. No. 6,922,497.

(60) Provisional application No. 60/425,019, filed on Nov. 8, 2002, provisional application No. 60/381,588, filed on May 17, 2002.

(51) Int. Cl.
   *G02B 6/26* (2006.01)
   *G02B 6/42* (2006.01)

(52) U.S. Cl. .................. 385/50; 385/15; 385/27; 385/28; 372/32; 372/92; 372/96; 372/108

(58) Field of Classification Search ................ 385/15, 385/27, 28, 50; 372/32, 92, 96, 108
See application file for complete search history.

(56) References Cited

U.S. PATENT DOCUMENTS

| | | | |
|---|---|---|---|
| 5,204,640 A | 4/1993 | Logan | 331/9 |
| 5,220,292 A | 6/1993 | Bianchini et al. | 331/1 R |
| 5,723,856 A | 3/1998 | Yao et al. | 250/227.11 |
| 5,777,778 A | 7/1998 | Yao | 359/245 |
| 5,917,179 A | 6/1999 | Yao | 250/227.11 |
| 5,929,430 A | 7/1999 | Yao et al. | 250/205 |
| 6,009,115 A | 12/1999 | Ho | 372/92 |
| 6,178,036 B1 | 1/2001 | Yao | 359/334 |
| 6,195,187 B1 * | 2/2001 | Soref et al. | 398/9 |
| 6,389,197 B1 | 5/2002 | Iltchenko et al. | 385/28 |
| 6,417,957 B1 | 7/2002 | Yao | 339/334 |
| 6,473,218 B1 | 10/2002 | Maleki et al. | 359/245 |
| 6,476,959 B2 | 11/2002 | Yao | 359/334 |
| 6,487,233 B2 | 11/2002 | Maleki et al. | 372/108 |
| 6,488,861 B2 | 12/2002 | Itchenko et al. | 216/24 |

(Continued)

OTHER PUBLICATIONS

Logan, et al.; Stabilization of Oscillator Phase Using a Fiber-Optic Delay-Line; 1991; 45th Annual Symposium on Frequency Control; pps 508-512.

(Continued)

*Primary Examiner*—Akm Enayet Ullah
*Assistant Examiner*—Daniel Petkovsek
(74) *Attorney, Agent, or Firm*—Fish & Richardson P.C.

(57) ABSTRACT

Optical filters having at least two coupled whispering-gallery-mode (WGM) optical resonators to produce a second order or higher order filter function with a desired spectral profile. At least one of the coupled WGM optical resonators may be tunable by a control signal to adjust the filtering function.

23 Claims, 13 Drawing Sheets

U.S. PATENT DOCUMENTS

| | | | | |
|---|---|---|---|---|
| 6,490,039 | B2 | 12/2002 | Maleki et al. | 356/436 |
| 6,535,328 | B2 | 3/2003 | Yao | 359/334 |
| 6,567,436 | B1 | 5/2003 | Yao et al. | 372/32 |
| 6,580,532 | B1 | 6/2003 | Yao et al. | 398/39 |
| 6,580,851 | B1 * | 6/2003 | Vahala et al. | 385/30 |
| 6,594,061 | B2 | 7/2003 | Huang et al. | 359/239 |
| 6,718,083 | B2 | 4/2004 | Lopes et al. | 385/16 |
| 6,762,869 | B2 | 7/2004 | Maleki et al. | 359/239 |
| 6,819,837 | B2 * | 11/2004 | Li et al. | 385/39 |
| 6,871,025 | B2 | 3/2005 | Maleki et al. | 398/183 |
| 2002/0018611 | A1 | 2/2002 | Maleki et al. | 385/15 |
| 2002/0039470 | A1 * | 4/2002 | Bruan et al. | 385/50 |
| 2002/0044739 | A1 | 4/2002 | Vahala et al. | 385/30 |
| 2003/0012504 | A1 | 1/2003 | Itchenko | 385/39 |
| 2003/0231826 | A1 * | 12/2003 | Boyd et al. | 385/27 |

OTHER PUBLICATIONS

L.E. Myers, et al.; Quasi-phase matched optical parametric oscillators in bulk periodically poled $LiNbO_3$; Nov. 1995; J. Opt. Soc. Am. B/vol. 12, No. 11; pps. 2102-2116.

X. Steve Yao, et al.; Converting Light into Spectrally Pure Microwave Oscillation; Apr. 1996; Optics Letters, vol. 21, No. 7; pps. 483-485.

H. Ito, et al.; InP/InGaAs uni-travelling-carrier photodiode with 310 GHz receiver; Oct. 12, 2000; Electronics Letters, vol. 36, No. 21; pps. 1809-1810.

V. Ilchenko, et al.; Sub-Micro Watt Photonic Microwave Receiver, Nov. 2002; IEEE Photonics Technology Letters, vol. 14, No. 11; pps. 1602-1604.

* cited by examiner

OPTICAL FILTER HAVING COUPLED WHISPERING-GALLERY-MODE RESONATORS

This application claims the benefit of U.S. Provisional Application No. 60/425,019 entitled "Second order filter response with series coupled silica microresonators" and filed on Nov. 8, 2002.

This application is a continuation-in-part of U.S. patent application Ser. No. 10/441,946 entitled "Whispering Gallery Mode Resonators Based on Radiation-Sensitive Materials" and filed on May 19, 2003 now U.S. Pat. No. 6,922,497. Further, U.S. patent application Ser. No. 10/441,946 claims the benefit of U.S. Provisional Application No. 60/381,588 filed May 17, 2002.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

The disclosures of the above three patent applications are incorporated herein by reference in their entirety as part of this application.

BACKGROUND

This application relates to optical filters, and more specifically, to optical filters based on optical resonators and cavities.

A dielectric material may be shaped to construct an optical whispering-gallery-mode ("WGM") resonator which supports a special set of resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, ranging from $10^3$ to $10^9$ for quartz microspheres. Hence, optical energy, once coupled into a whispering gallery mode, can circulate within the WGM resonator with a long photon life time. Such hi-Q WGM resonators may be used in many optical applications, including optical filtering, optical delay, optical sensing, lasers, and opto-electronic oscillators.

SUMMARY

Various exemplary implementations described in this application optically cascade two or more optical WGM resonators to form composite optical filters with desired filter transmission profiles. An input optical signal is coupled through the resonators to produce a filtered optical output signal. Each resonator operates as an optical filter to allow only light in resonance with the resonator to be coupled into and to pass through the resonator while other spectral components of the input optical signal being rejected. Two adjacent cascaded WGM resonators are optically coupled to each other so light in one resonator is coupled into the other resonator.

In one implementation, at least one of the cascaded WGM resonators may be a tunable resonator to change its filter function in response to a filter control signal. This change in the filter function is reversible and may be dynamically altered. Hence, the relative spectral position of this tunable resonator may be adjusted as needed in a controlled manner to achieve a proper overlap of the tunable filter function with the filter function of the at least another WGM resonator. In a two-resonator composite filter system, both resonators may be tunable filters and may be tuned relative to each other to achieve the desired filtering function. A tunable WGM resonator may use an electro-optic material to construct the WDM resonator and a control voltage may be applied to adjust the filter function.

In another implementation, a device includes first and second optical resonators each configured to support whispering gallery modes. The first and second optical resonators are optically coupled to allow for light coupling from a first whispering gallery mode in the first optical resonator to a second whispering gallery mode in he second optical resonator. The first optical resonator is made of an electro-optic material to be tunable in response to a control signal to change a property of an optical signal passing through the first and second optical resonators. The second optical resonator is made of a radiation-sensitive material that changes a refractive index when exposed to sensitizing light at a sensitizing wavelength.

A method is also provided in this application where first and second optical resonators are optically coupled via evanescent fields. Each optical resonator supports whispering gallery modes. At least one of the first and the second optical resonators is dynamically tunable to change optical transmission in response to a control signal. The control signal is changed to adjust optical transmission through both the first and second optical resonators.

These and other implementations are now described in greater details in the following drawings, the detailed description, and the claims.

DETAILED DESCRIPTION

A single WGM resonator as an optical filter generally produces a Lorentzian-shaped filter function. However, non-Lorentzian filter functions may be desirable in certain applications. For example, a sharper spectral roll-off than the typical Lorentzian filter function may be desired filtering certain optical signals. As another example, it may be desirable to have a relatively flatter spectral passband than a Lorentizn filter function. A composite filter may thus be constructed to produce such and other non-Lorentzian filter functions by optically cascading and coupling two or more WGM resonators. In this composite filter, an input optical signal passes through the WGM resonators and is filtered more than once to produce the desired output spectral profile in the optical transmission of the filter.

In designing such a composite filter, the resonator frequencies of the cascaded WGM resonators are set to be close to one anther to overlap their respective filter functions. It is desirable that the relative positions of the resonator frequencies are properly selected in order to achieve the desired filter function for the composite filter. Certainly, the relative positions of the resonator frequencies may be permanently fixed during fabrication of the WGM resonators and assembly of the composite filter. However, it may be preferable that such a composite filter be tunable so that a specific composite filter function may be generated and changed at a user's choice. The tuning is temporary in the sense that the composite filter function is constant when the corresponding control signal is set a particular state or value. As the control signal is adjusted, the composite filter function is also changed accordingly. Therefore, the composite filter may be dynamically adjusted during operation of the filter or set to produce different filter functions for different operating conditions or in different applications. This tunability in the non-Lorentzian filter function can provide the user with the flexibility in using the same composite filter in different operating conditions and in different applications.

Figure 1:
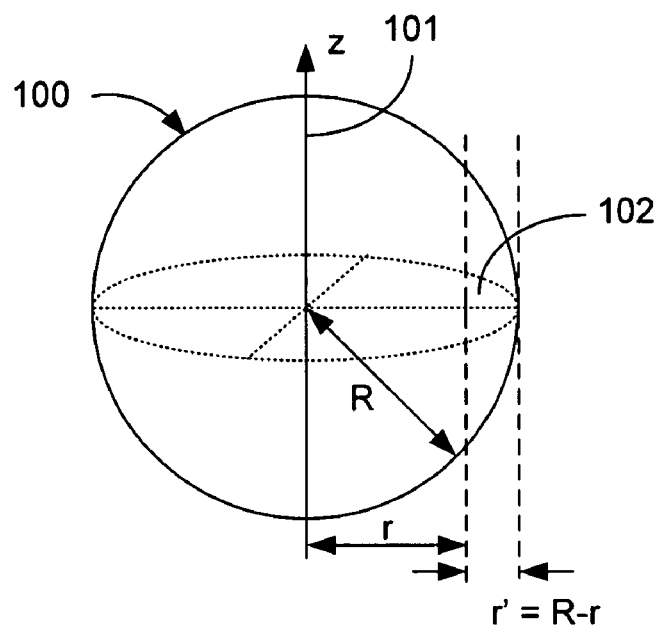
FIGS. 1, 2, 3, 4A, and 4B illustrate various exemplary resonator configurations that support whispering gallery modes and are formed of radiation-sensitive materials for spectral tuning.
Figure 2:
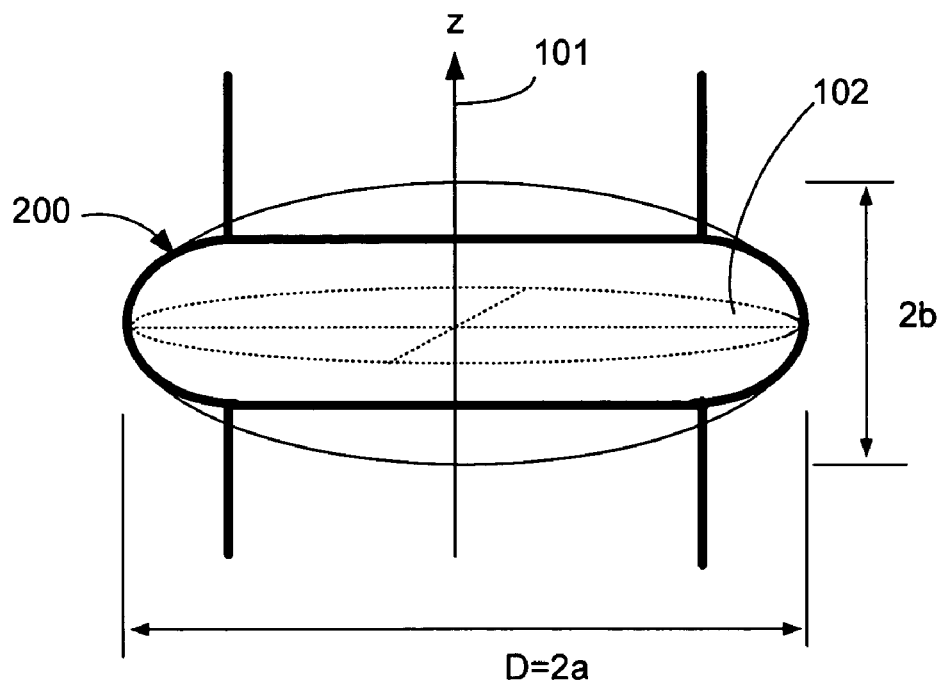
Figure 3:
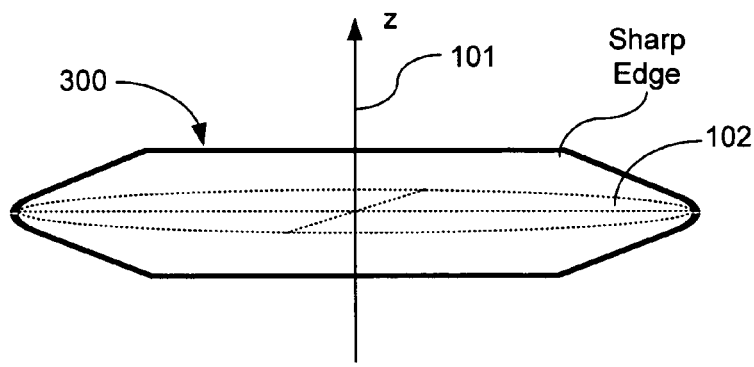

Prior to describing the specific implementations of the composite filters, the following sections first describe the exemplary geometries of the WGM resonators that may be used in such composite filters. FIGS. 1, 2, and 3 illustrate three exemplary geometries for implementing such WGM resonators.

FIG. 1 shows a spherical WGM resonator 100 which is a solid dielectric sphere. The sphere 100 has an equator in the plane 102 which is symmetric around the z axis 101. The circumference of the plane 102 is a circle and the plane 102 is a circular cross section. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 (z). Therefore, similar to the spherical resonator in FIG. 1, the plane 102 in FIG. 2 also has a circular circumference and is a circular cross section. Different from the design in FIG. 1, the plane 102 in FIG. 2 is a circular cross section of the non-spherical spheroid and around the short ellipsoid axis of the spheroid. The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. More specifically, the geometry of the cavity in the plane in which Z lies such as the zy or zx plane is elliptical. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola. Note that the plane 102 in FIG. 3 is a circular cross section and a WG mode circulates around the circle in the equator.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
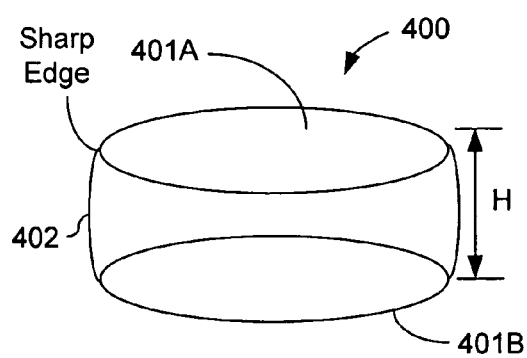
Figure 4B:
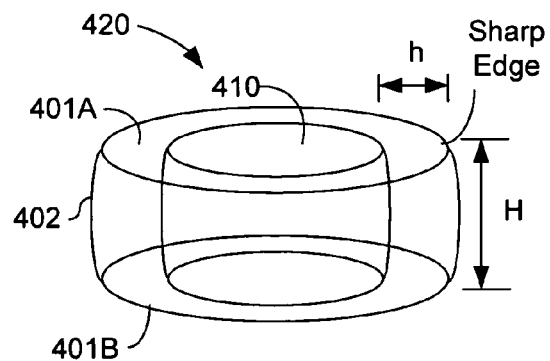

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
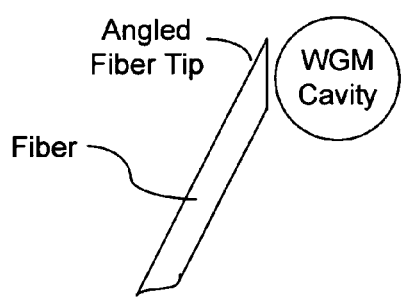
FIGS. 5A and 5B illustrate two evanescent coupling examples.
Figure 5B:
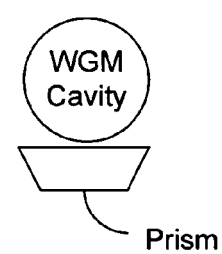

An optical coupler is generally used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. A waveguide with an angled end facet, such as a planar waveguide or other waveguide, may also be used as the coupler. FIG. 5B shows a micro prism as a coupler for the WGM resonator. Other evanescent couplers may also be used, such as a coupler formed from a photonic bandgap material.

In WGM resonators with uniform indices, a part of the electromagnetic field of the WG modes is located at the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value.

Figure 6A:
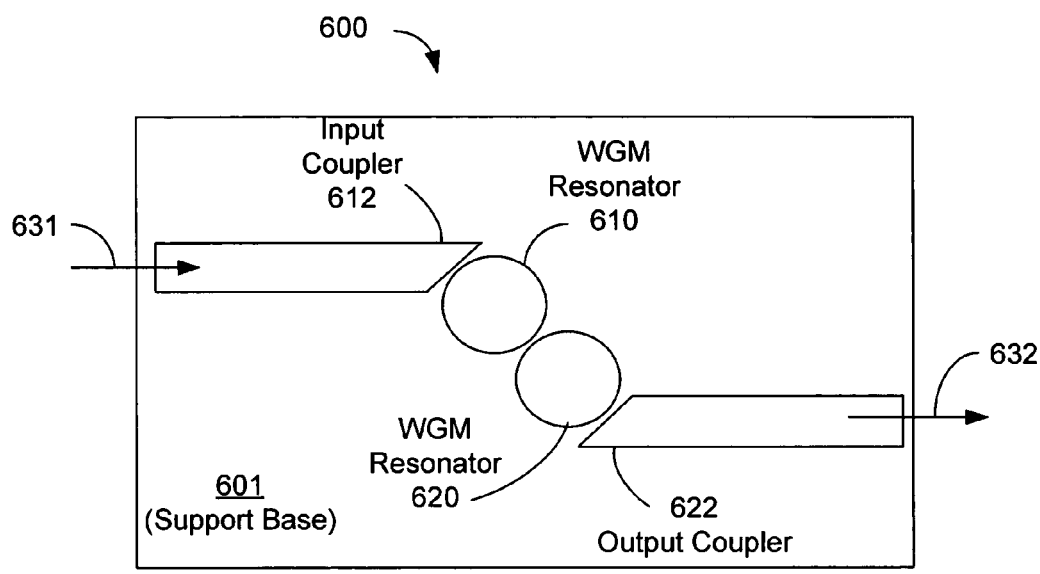
FIG. 6A shows one exemplary two-resonator composite filter formed on a support base.

FIG. 6A shows an exemplary composite filter 600 having two cascaded WGM resonators 610 and 620. The resonators 610 and 620 may be identical and may be different. In some implementations, both resonators may have approximately the same diameter or dimension to have similar quality factors. In certain other implementations, it may be advantageous to use different resonators 610 and 620 with different geometries or physical dimension to use their difference in the spectral profile to produce the desired composite filter function. The resonators 610 and 620 are placed close to or in contact with each other to allow for direct optical coupling under proper resonance conditions. Alternatively, an optical coupling mechanism may be placed between the resonators 610 and 620 to assist and facilitate the inter-resonator optical coupling. An input optical coupler 612 is placed near or in contact with the first resonator 610 to couple an input optical signal 631 into the first resonator 610 of the filter 600. An output optical coupler 622 is placed near or in contact with the second resonator 620 to couple optical energy inside the second resonator 620 out to produce an output optical signal 632 as the transmission of the filter 600. As illustrated, a support base 601, such as a substrate, may be used to hold and fix the components of the filter 600 in position.

Figure 6B:
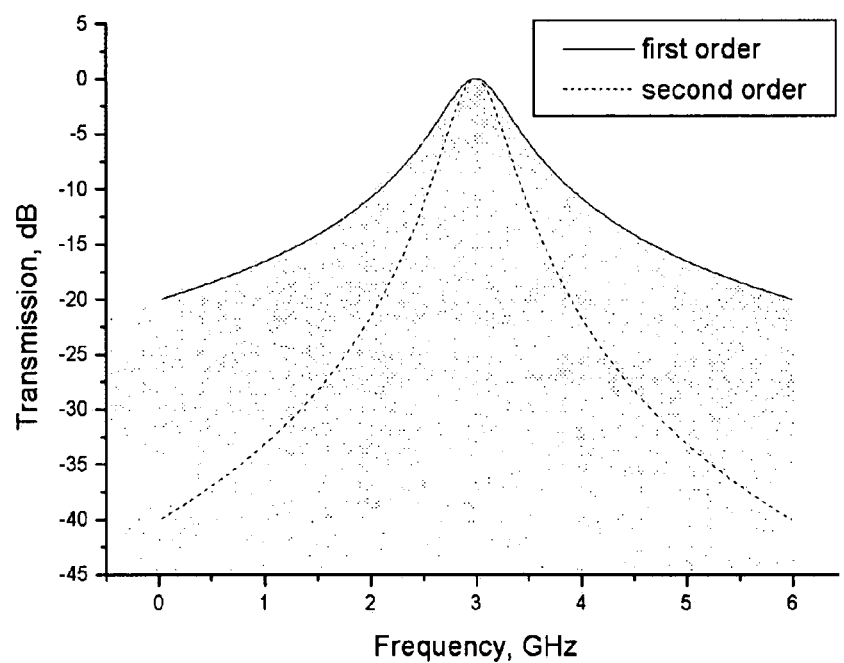
FIG. 6B shows an exemplary second-order filter of the composite filter in FIG. 6A in comparison with the first-order function of a single resonator filter.

FIG. 6B illustrates the second-order, non-Lorentzian filter function as a function of the frequency in the output 632 of the filter 600. As a comparison, the first-order Lorentzian function of a single resonator is shown.

Figure 7A:
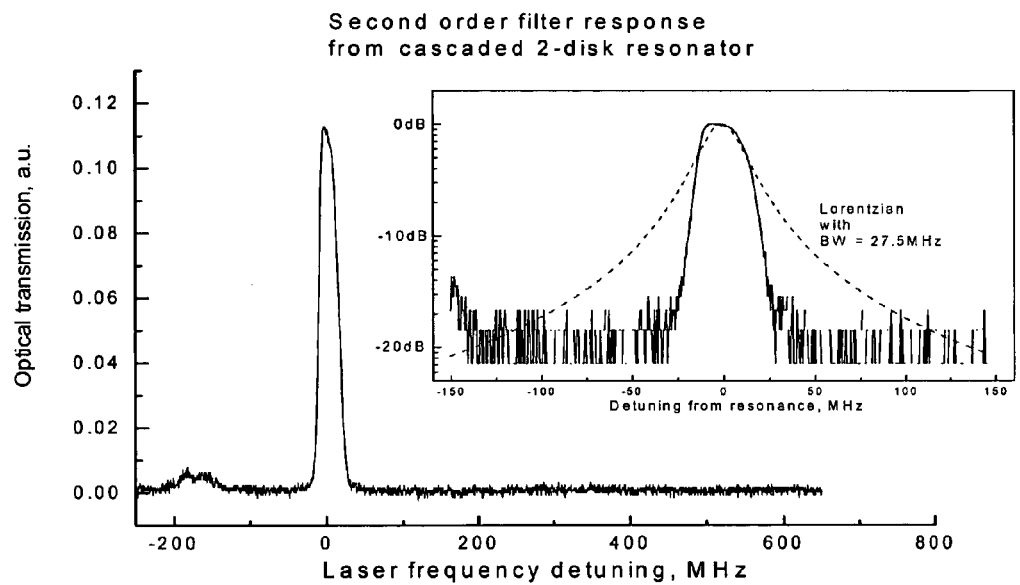
FIGS. 7A and 7B show measured filtering properties of a composite filter which has two silica WGM resonators directly coupled to each other.
Figure 7B:
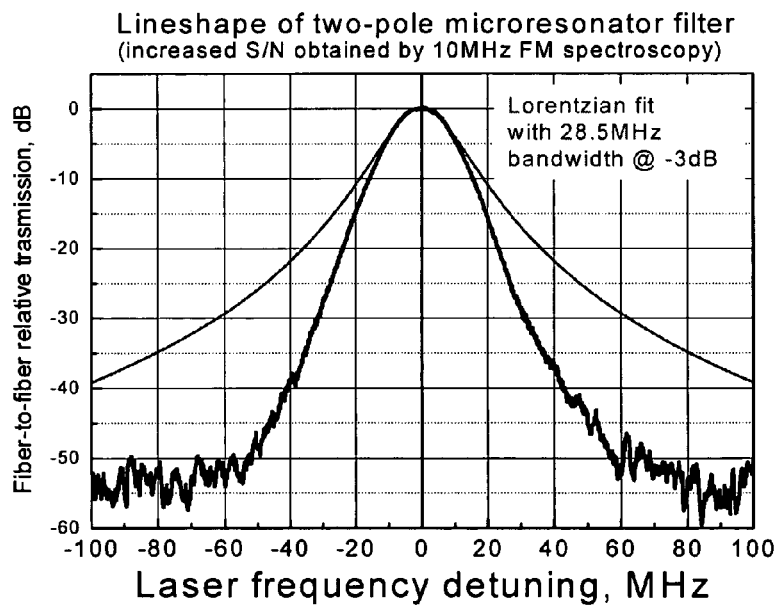

FIGS. 7A and 7B show measurements of a two-resonator composite filer based on the design in FIG. 6A. Both resonators are made of silica disks that have toroidal geometries as shown in FIG. 2. The silica resonators are in direct contact with each other to allow for optical coupling via evanescent fields. Two fiber couplers are respectively coupled to the silica resonators as the input and output couplers. FIG. 7A shows the optical transmission of the composite filter. Its insert and FIG. 7B show the spectral details of the measured second-order transmission peak.

Figure 8:
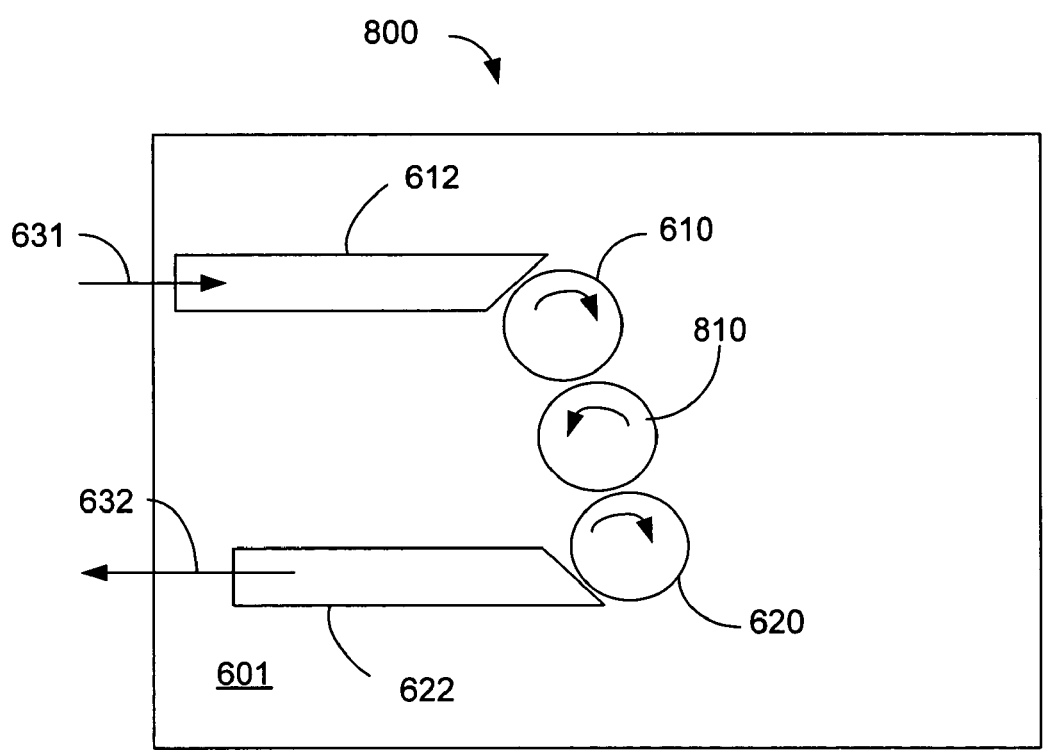
FIG. 8 shows an exemplary composite filter with three coupled WGM resonators.

FIG. 8 shows another exemplary composite filter 700 with three cascaded WGM resonators 610, 810, and 620. In the configuration as shown, the WGM modes circulate in the resonators 610 and 620 in a clock-wise direction, in the resonator 810 in a counter-clock-wise direction, respectively. Hence, the output coupler 622 is oriented accordingly to couple the light out of the last resonator 620. Implementation of additional cascaded resonators allows for additional flexibility in designing the final composite filter function and produces higher order filter functions.

Figure 9A:
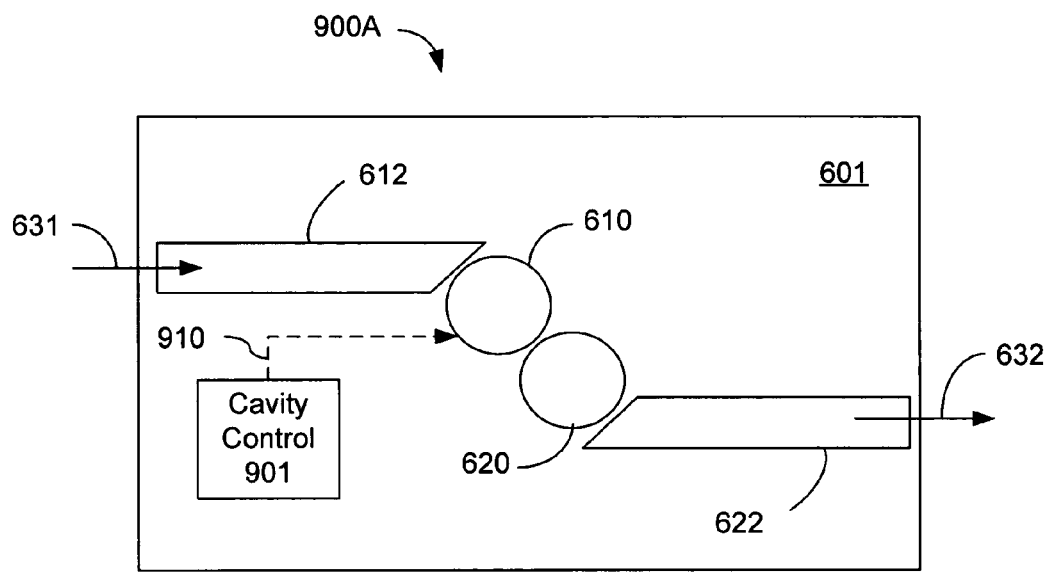
FIGS. 9A and 9B show two exemplary tunable composite filter with two cascaded WGM resonators where either one or both resonators may be tunable.

FIG. 9A shows an exemplary tunable composite filter 900A having a tunable WGM resonator 610 and a fixed WGM resonator 620. A cavity control unit 901 is coupled to control and tune the resonator 610 via a control signal 910. In general, the tunable resonator 610 may be tuned in any suitable manner by using the control signal 910 to adjust a parameter of the resonator 610, e.g., a direct change in its refractive index, its temperature, its geometry, etc. Such a change causes the cavity resonance to shift relative to the resonance of the second fixed resonator 620, or other parameter in the output of the resonator 610 (e.g., the linewidth) to change. Alternatively, the first resonator that receives the input 631 may be a fixed resonator while the second resonator 620 may be a tunable resonator. The tuning of a tunable resonator, such as tuning of its refractive index, generally has an operating range. The corresponding control signal may be adjusted to tune and set the resonator to any point within the operating range if needed.

Figure 9B:
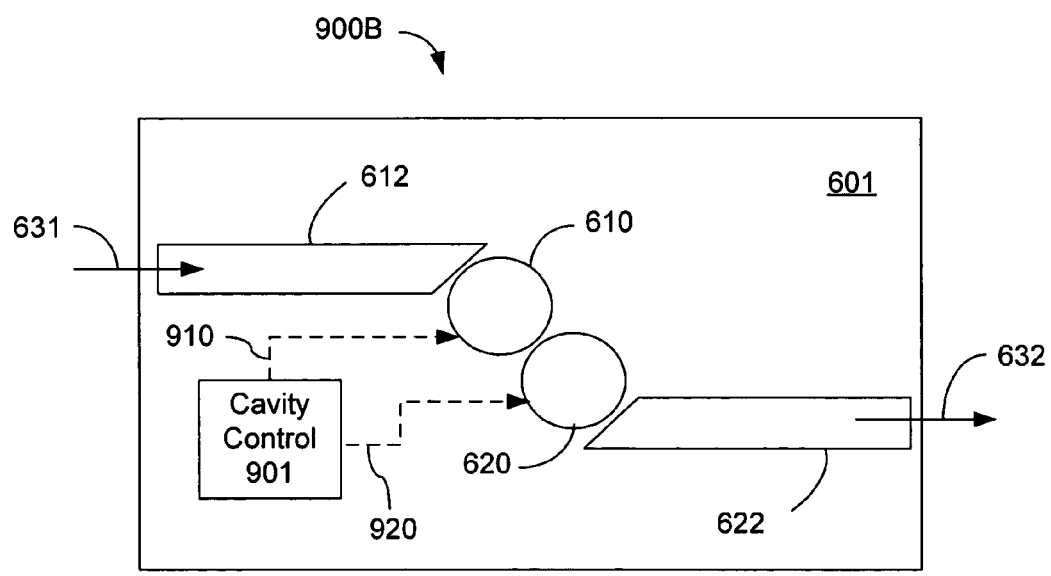

FIG. 9B shows another exemplary composite filter 900B where both resonators 610 and 620 are tunable filters. The control unit 901 may use two different control signals 910 and 920 to control and tune the resonators 610 and 620, respectively. In comparison with FIG. 9A, the filter in FIG. 9B provides more flexibility in tuning the composite filter.

Various mechanisms may be used to tune a WGM resonator. The dielectric material, the shape and dimension of the resonator, the conditions of the surroundings of the resonator, and the coupling of the optical coupler for the resonator may affect the spectral properties of the resonator. For a given dielectric material under known surrounding conditions, a resonator may be tuned to alter its spectral properties by changing the shape of the resonator through, e.g., stretching or compressing the resonator. In another example, the temperature of the resonator may be controlled to change both of its dimension and its refractive index to change the filter function of the resonator.

In particular, a WGM resonator may be made of a material whose index changes in response to an applied stimulus such as a radiation field or an electric field. Such tuning mechanisms avoid certain complications associated with a change in the shape or dimension of the resonator. For example, an electro-optic material may be used to construct the WGM resonator and an external electric field may be applied to change the refractive index of the resonator in tuning the resonator.

Figure 10A:
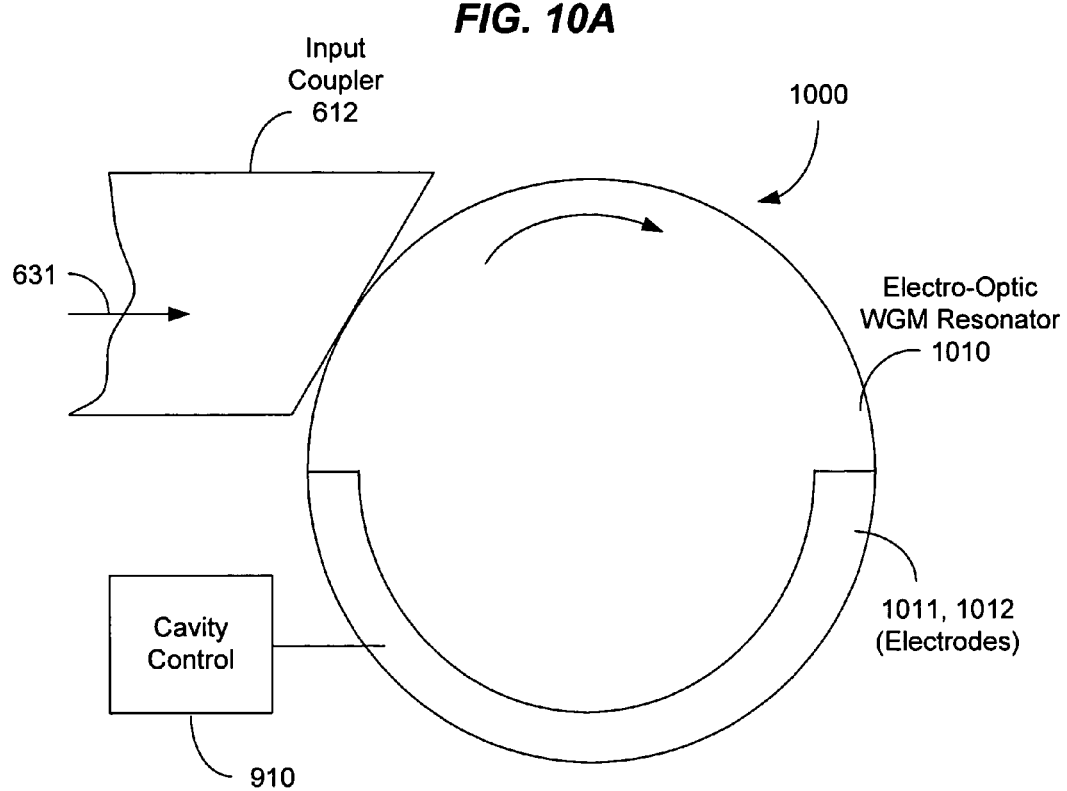
FIGS. 10A and 10B show one implementation of a tunable WGM resonator based on an electro-optic effect.
Figure 10B:
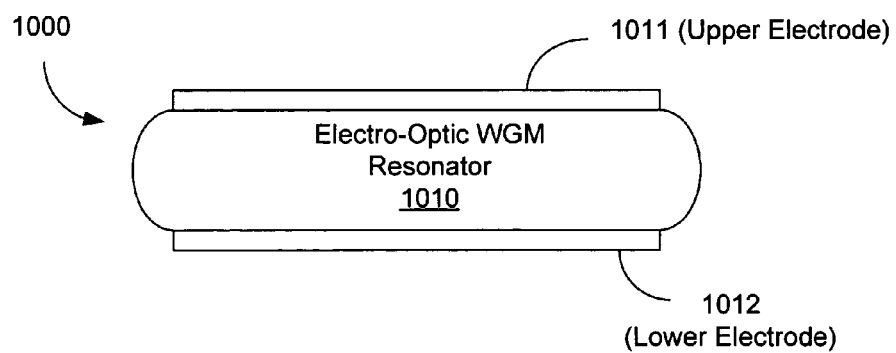

FIGS. 10A and 10B shows an example of a tunable electro-optic WGM resonator 1000 used as the first resonator 610 in FIG. 9A. Such an electro-optic WGM resonator may also be used as the second resonator in FIG. 9A. The electro-optic material for the resonator 1000 may be any suitable material, including an electro-optic crystal such as Lithium Niobate and semiconductor multiple quantum well structures. One or more electrodes 1011 and 1012 may be formed on the resonator 1000 to apply the control electrical field in the region where the WG modes are present to control the index of the electro-optical material and to change the filter function of the resonator. Assuming the resonator 1000 has disk or ring geometry as in FIG. 4A or 4B, the electrode 1011 may be formed on the top of the resonator and the electrode 1012 may be formed on the bottom of the resonator as illustrated in the side view of the device in FIG. 10B. In one implementation, the electrodes 1011 and 1012 may constitute an RF or microwave resonator to apply the RF or microwave signal to co-propagate along with the desired optical WG mode. The electrodes 1011 and 1012 may be microstrip line electrodes.

In the above optical filters with two or more coupled WGM resonators, at least one of the coupled WGM resonators may be made of a radiation-sensitive material for permanently tuning the spectral properties of the WGM resonator by illumination of the resonator with sensitizing light after it is fabricated and without changing the geometry of the resonator. In one implementation, for example, a dielectric material transparent to radiation of wavelengths in a first radiation spectral range is configured to change a refractive index of the material when exposed to sensitizing radiation at a sensitizing wavelength in a second radiation spectral range. The first spectral range may s be any range in which the resonator is to be operated, such as wavelengths around 1550 nm for optical communications. The second spectral range is different and separate from the first spectral range, such as the UV range or other suitable spectral ranges different from the spectral range of the light in WG modes. A micro resonator is fabricated from the dielectric material to support whispering gallery modes for radiation in the first radiation spectral range. Next, the fabricated resonator is exposed to radiation at the sensitizing wavelength in the second radiation spectral range to modify the refractive index of the resonator until the refractive index is changed to a desired value at which the resonator produces a desired resonator spectrum in the first spectral range.

The above change of the index by exposure to the sensitizing radiation is generally permanent. This may be achieved by doping the dielectric material with radiation-sensitive ions, e.g., a Ge-doped silica that is sensitive to UV sensitizing light. Under this approach, the change in the index of the resonator is controlled by controlling the exposure. A number of advantages can be achieved with this approach. For example, the permanent nature of the change in the index avoids the technical difficulties of maintaining the precise amount of stretching or compression on the resonator in typical mechanical approaches. Different WGM resonators may be tuned with this approach to have one or more common resonator frequencies. A WGM resonator may be so tuned to a desired resonator frequency in a systematic and controllable manner. In addition, different resonant frequencies of such a resonator can be tuned at the same time as a whole so that there is no need for correcting relative shifts of spectral lines. This approach is simple without complex mechanical controls or chemical processing steps. The tuning may be monitored and controlled with desired precision.

One convenient implementation of the radiation-sensitive material for any of above WGM resonator configurations is to use a UV-sensitive material to fabricate the resonator. After the resonator is fabricated, the resonator is exposed to the UV light at the proper wavelength to change the index. Ge-doped silica, for example, has low optical losses at about 1550 nm and a high sensitivity to UV sensitizing light. It is possible to shift the index of such a silica by an amount of about $10^{-2}$ to $10^{-4}$ with proper amount of exposure to the UV light at about 351 nm. In the frequency domain, an eigen frequency of 200 THz of a WGM resonator may be shifted from 10 to 1000 GHz. For a microsphere resonator with a diameter of about 1000 microns, This shift is close to the free spectral range of the resonator. Hence, with this large tuning range comparable to the free spectral range, it is possible to design and engineer the eigen frequency of a WGM resonator to be at any desired frequency.

FIG. 10 shows measured resonance frequency shifts in GHz as a function of the exposure time for exposing a Ge-doped silica microsphere resonator to a UV sensitizing laser beam of about 600 mW at a sensitizing wavelength of about 351 nm. A maximum of 18 GHz in the frequency shift was measured in a resonator formed of uniform Ge-doped silica. This is greater than one non-azimutheal free spectral range of a microsphere resonator with a diameter greater than 100 microns.

Figure 12:
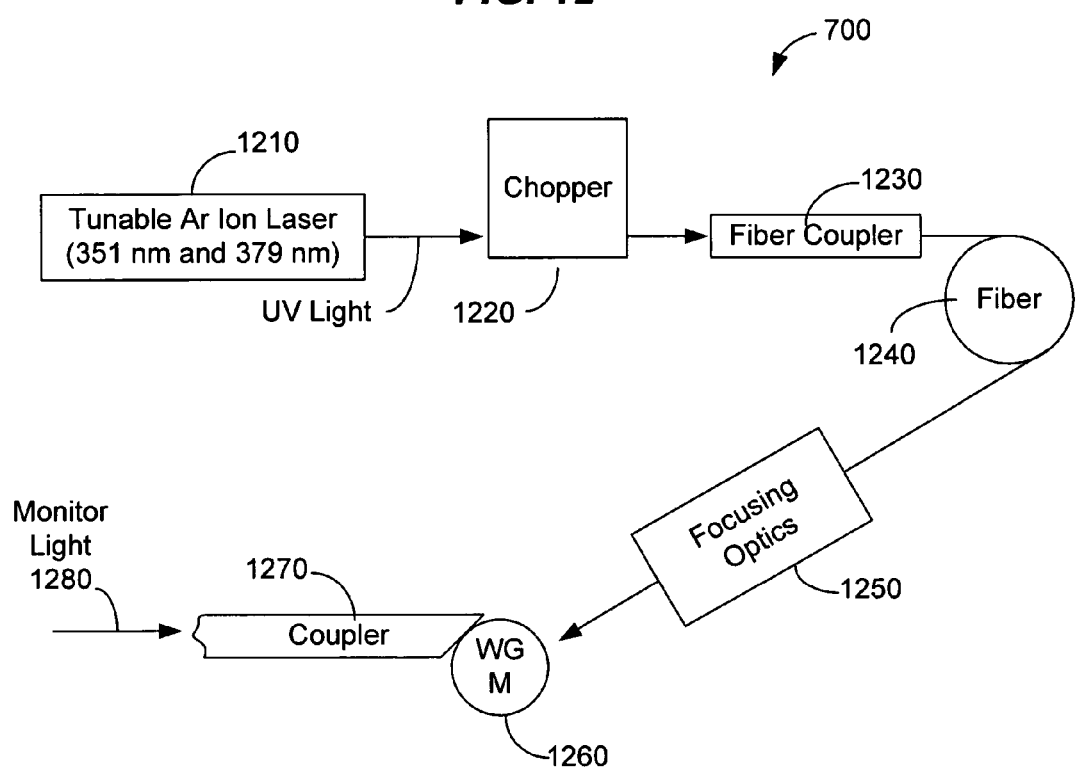
FIG. 12 shows an exemplary system for permanently shifting the resonance frequency of a WGM resonator formed of a radiation-sensitive material.

FIG. 12 shows an exemplary system 1200 for tuning the spectral properties of a WGM resonator 1260 by radiation exposure. A radiation source 1210 such as a UV laser is provided to produce the radiation at the desired wavelength to which the material of the resonator 1260 is sensitive. For UV-sensitive Ge-doped silica as the resonator material, a tunable CW Ar ion laser may be used to produce UV light at wavelengths of 351 nm and 379 nm. Ge-doped silica has a maximum sensitivity to UV light at about 334 nm where its change in the refractive index reaches maximum. At 351 nm, the Ge-doped silica shows a sufficient UV sensitivity for purpose of permanently tuning the resonator frequency of this application. The sensitivity of Ge-doped silica at 379 nm is low in comparison to the sensitivity at 351 nm. As described below, the 379-nm light is used to induce a temporary shift in the resonator frequency due to heating by optical absorption so that the permanent frequency shift due to the UV sensitivity of the resonator 1260 can be properly monitored.

The system 1200 includes a chopper 1220 to periodically turn on and off the UV light to the resonator 1260 to vary the duration of the exposure, e.g., from 2 to 60 seconds, to monitor the shift of the resonator frequency mainly due to the thermal effect caused by exposure to the 371-nm UV light. A separate light source is used to produce a monitor light beam 1280 at a spectral range different from UV at which the resonator 1260 support WG modes. An optical coupler 1270 such as a fiber coupler or a prism coupler may be used to couple the monitor light 1280 into a WG mode in the resonator 1260. A separate output coupler may be used to couple the light at the wavelength of the monitor light 1280 out of the resonator 1260 for measurements. The spectrum of the resonator at the wavelength of the monitor light 1280 is monitored to measure the frequency shift of the resonator frequency. As an example, a tunable 1550-nm diode laser may be used to produce the monitor light 1280 at about 1550 nm. To control the frequency shift of the this diode laser, an erbium-doped fiber amplifier, and a Fabry-Perot cavity as a frequency reference marker may be used to stabilize the diode laser. This 1550-nm light can be used to measure the spacing between the spectral lines.

As illustrated in FIG. 12, a fiber coupler 1230 may be used to couple the UV light from the light source 1210 and the chopper 1220 into a multimode fiber 1240. A focusing optical element 1250 may be coupled at the opposite end of the fiber 1240 to focus the UV light to the WGM resonator 1260. The output facet of the fiber 1240 may be a convex surface to effect a focusing lens as the element 1250. The output light from the resonator 1260 is sent to a photodiode that produces a spectrum of the resonator 1260 as the laser frequency of the monitor light 1280 is tuned. The output light exits the microsphere at an angle of about 5 to 15 degrees from the direction of the incident light, so that the two beams are physically separated.

The exposure to the UV radiation at 351 nm permanently changes the chemical structure of Ge-doped silica and thus the index of the resonator 1260. It is recognized that the UV light also heats up the resonator 1260 and causes a temporary thermal shift in the resonator frequency. Thus, both UV sensitivity of the Ge-doped silica and the temporary thermal effect cause the frequency shift of WGMs. The instantaneous effect of heating may be stronger than the effect due to UV-assisted permanent shifts.

The frequency shifts due to the two effects may be separated in order to accurately monitor and measure the permanent shift by the UV sensitivity. One method, for example, is to alternately open and close the chopper 1220 at intervals sufficiently long, e.g., several to tens of seconds, to allow the resonator 1260 to cool down so that the frequency shift caused by transient thermal effects can be separated from that caused by a permanent chemical change.

In another method, the UV light at 379 nm is first used to illuminate the resonator 1260 to primarily cause the thermal shift in the resonator frequency. At this wavelength, the permanent frequency shift due to the UV sensitivity is small relative to the thermal shift. After the thermal effect reaches a stable state, the UV light is tuned from 379 nm at which the UV sensitivity is low to 351 nm at which the UV sensitivity is high. The additional shift in the resonator frequency after tuning the UV light to 351 nm is primarily caused by the UV sensitivity. After the additional frequency shift reaches a desired value, the UV light is turned off.

This method may be implemented by first focusing the 351-nm UV light to a location where the resonator 1260 is to be placed and then tuning the UV light to 379 nm and placing the resonator 1260 at the location to receive the illumination of the 379-nm light. The spot location of the 379-nm light on the resonator 1260 is adjusted so that the thermal shift is at its maximum. At this beam location on the resonator 1260, the permanent shift by the 351-nm light is also at its maximum. The 379-nm light is chopped with varying periods, e.g., from 2 to 60 seconds, to monitor the thermal shifts. Next, the UV light is tuned back to 351 nm to cause the permanent frequency shift. The spectrum of the resonator 1260 is monitored and the 351-nm light is turned off when the permanent shift reaches the desired value.

Prior to the above radiation exposure to modify the resonator frequency, the WGM resonator 1260 is fabricated. This may be done by a number of fabrication techniques. For example, a Ge-doped silica rod may be stretched into a filament under a heated condition, e.g., by using a hydrogen-oxygen microburner to stretch the rod into a filament of about 30 microns. Subsequently, the tip of the filament may be heated by, e.g., using a flame from a torch, to form a sphere as the resonator 1260. Such a Ge-doped silica rod may be a germanate glass optical fiber with core material containing 19–20 molar percent of germanium oxide.

In another example, a pure silica sphere may be covered by a small amount of germanium oxide powder. The sphere is subsequently heated to a controlled temperature to melt the germanium oxide without melting the silica sphere. The melted germanium oxide forms a thin coating over the surface of the sphere. A small amount of germanium oxide diffuses below the surface of silica to form a thin shell of photosensitive material. The above process may be repeated many times to produce a germanium oxide-coated/doped spheres of sufficient photosensitivity for tuning the resonator frequency by UV exposure.

Generally speaking, a single WGM resonator produces a Lorentzian-shaped filter function. However, in certain optical systems or applications, it is desirable to have a relatively flat spectral passband or a transmission with a sharp roll-off edge. It is difficult to use a single WGM resonator in such applications despite of many advantages of WGM resonators. Two or more WGM resonators, however, may be cascaded in an optical path to sequentially filter an input optical signal to produce a non-Lorentizian spectral shape with flatter transmission and improved rejection of the out of band spectral components. In particular, two sequentially coupled microcavities may be tuned relative to each other to have their resonator frequencies to be close to one anther to form a two-cavity composite filter with a nearly top-hat shaped second order filter function. The above described tuning of the resonator frequency with a real-time monitoring provides a method for precise tuning resonances in two WGM resonators with at least one resonator formed from a UV-sensitive material into close proximity so that their uncoupled resonance curves would overlap in the frequency domain.

Figure 13:
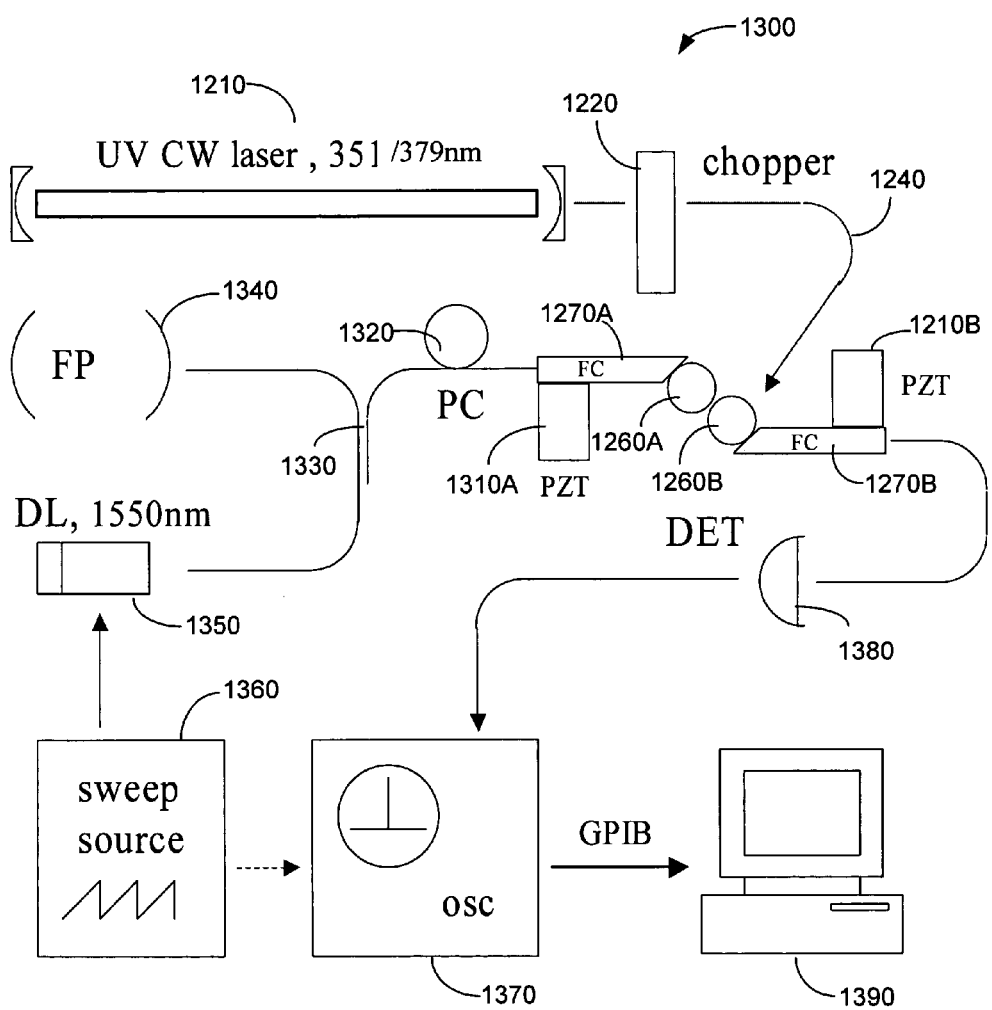
FIG. 13 shows an exemplary system for assembling a composite filter formed of two cascaded WGM resonators with a spectrum-monitoring mechanism.

FIG. 13 shows a system 1300 for assembling and tuning a composite WGM filter with two cascaded WGM resonators 1260A and 1260B. In this particular implementation, only one of the two resonators 1260A and 1260B is formed of a UV-sensitive material and its resonator frequency can be tuned by permanently changing the index by UV light. For example, the first resonator 1260A may be formed of a material whose index does not change with the UV light and its resonator frequency is essentially fixed. The second resonator 1260B is formed of a UV sensitive material such as Ge-doped silica and its resonator frequency can be tuned relative to the resonator frequency of the first resonator 1260A. The two resonators 1250A and 1260B are placed close to each other to effectuate optical coupling therebetween so that light in the first resonator 1260A can be coupled into the second resonator 1260B. Notably, the equators of the cavities 1260A and 1260B are placed in a substantially the same plane to allow for coupling via the evanescent field. Two optical couplers 1270A and 1270B are respectively coupled to the resonators 1260A and 1260B as optical input and output ports, respectively. Hence, light received from the coupler 1270A is coupled into the resonator 1260A, then to the resonator 1260B, and finally to the coupler 1270B as a filtered output. Any suitable optical coupler may be used. FIG. 13 shows angle-polished fiber couplers as an example. Couplers and resonators may be placed on miniature PZT translators 1310A and 1310B to allow for adjustment of their relative positions to manage the coupling. In general, any suitable positioning devices may be used to replace the PZT translators. When the resonators 1260A and 1260B are properly tuned and positioned, the input light in the coupler 1270A may pass through both resonators with less than a 3 dB fiber-to-fiber loss.

Figure 11:
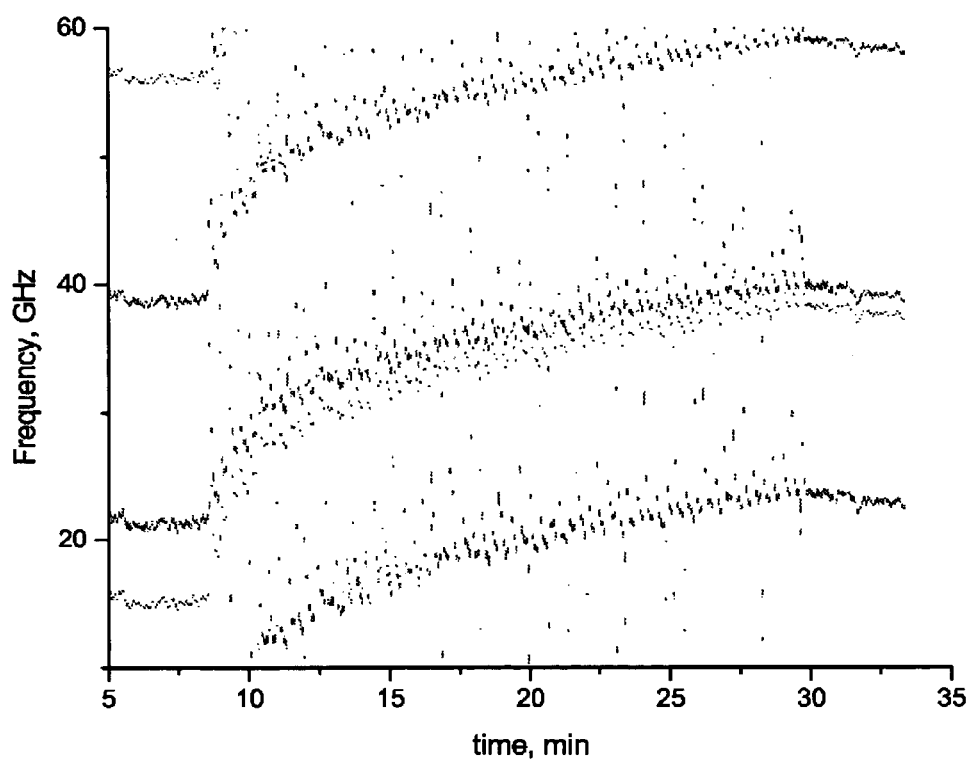
FIG. 11 shows frequency shifts in the resonance frequency as a function of exposure time for a WGM microsphere resonator formed of Ge-doped silica caused by exposure to UV light at 351 nm.

The system 1300 also includes the monitor light source 1350 such as a tunable diode laser at 1550 nm to produce the input probe light to the input coupler 1270A, a laser stabilization system for stabilizing the laser frequency of the laser 1350, the UV light source 1210 for tuning the resonator 1260B, and an optical detector for receiving the filtered output from the output coupler 1270B. The frequency of the laser diode 1350 may be current modulated by with a sawtooth signal from a signal generator 1360. To increase the laser power, an erbium-doped fiber amplifier may be placed at the output of the laser 1350. One part of this output may be split and coupled into a Fabry-Perot resonator 1340 as part of the laser stabilization system with a FSR of about 20 GHz. The resonator 1340 serves as a reference to correct for any laser frequency drift, and for measuring the spacing between resonance lines of the WGM cavity. The remaining part of radiation from the erbium-doped fiber amplifier is fed into the coupler 1270A such as an angle-polished fiber and is coupled into the first resonator 1260A. Since the two resonators are placed close to each other to allow for light coupling, the light in the resonator 1260A is coupled to the resonator 1260B. In turn, the light in the resonator 1260B is coupled by the output coupler 1270B to an optical detector such as a photodiode 1380. The detector output from the detector 1380 is sent into an oscillator 1370 to display the signal based on the triggering signal from the sweep source 1360. Both the signals from the detector 1380 and the sweep source 1360 are stored and processed by a signal processor 1390 such as a computer so that a plot of current versus time can be obtained as the frequency spectrum of the composite filter formed of the resonators 1260A and 1260B. As in FIG. 11, the fiber 1240 with a convex tip may be used to focus the output of the UV argon-ion laser 1210 onto the surface of the UV-sensitive Ge-doped silica resonator 1260B to allow for a permanent shift of the resonator modes in order to adjust the relative resonator frequencies of the resonators 1260A and 1260B to form a desired second order output spectrum.

In general, any WGM resonator geometries may be used for the resonators 1260A and 1260B, including the spherical and toroidal resonators. Toroidal resonators as one class of non-spherical resonators are more difficult to fabricate, but have the advantage of a much sparser frequency spectrum. This occurs because microtorus WGMs with trajectories localized far from the equatorial plane of the cavity have high losses and, therefore, are effectively removed from the resonator's spectrum. The two resonators 1260A and 1260B may have the same resonator geometry, e.g., both being spherical or toroidal. Alternatively, they may have different resonator geometries, e.g., one being spherical and other being toroidal. In addition, the first resonator 1260A may be made of a UV-sensitive material and the second resonator 1260A may not be sensitive to UV. Although it is generally sufficient to have only one of the resonators 1260A and 1260B to be sensitive to UV for permanent tuning, it is also possible to make both resonators 1260A and 1260B to be tunable by UV light.

In implementations, both resonators 1260A and 1260B may have approximately the same diameter. This is because the size of a cavity affects the quality of its resonance and cavities of similar sizes have similar quality factors. Hence, under this condition, the resonators 1260A and 1260B have similar Q factors. The mode structure of the resonator formed of pure silica appears to remain essentially unchanged within the resolution of the monitoring system, despite some exposure by small amounts of reflected and refracted UV light from the other UV-sensitive resonator. Pure silica does possess some very small UV photosensitivity; however it is much smaller than that of germanate glass and thus does not affect the tuning of the composite filter.

The differences in the size of the cavities is rather important because the Q factors and the spectral linewidths are affected by the resonator sizes. If resonances of two interacting cavities have differing spectral linewidths, the height of the narrower resonance will simply track the shape of the wider one as they are made to approach one another to be optically coupled. This may not be useful for many filtering applications. Hence, it is desirable to produce spectral lines of both resonators of a similar width to achieve a complex spectral line structure.

In operation of the system 1300 to set up and tune the composite filter with two resonators 1260A and 1260B, the setup is first adjusted to achieve the maximum efficiency in the photochemical process to shorten the time of tuning. The maximum efficiency occurs when the UV light is focused just inside the equator of a doped sphere (or a torus), at a point where the WG modes have a large field intensity. To achieve this, the argon-ion laser 1210 is first tuned to the 379-nm line. Laser radiation at this wavelength affects the chemistry of the Ge-doped silica, but the process is relatively slow. Hence, the overall effect can be made negligible if the exposure time is kept short. Nonetheless, the absorbed UV in the material results in thermal expansion, which produces a visible shift in the resonance frequencies. If the position of the UV fiber 1240 is adjusted to fine tune the beam location in the UV-sensitive resonator such that the thermal shift in the frequency spectrum is a maximum, then the UV light is properly focused at the point of the maximum efficiency.

After the above proper alignment, the UV laser 1210 is tuned to 351 nm, which is the most photochemically efficient wavelength generated by the UV argon laser 1210. To be sure that the system is stable, several data points were first taken with the UV beam blocked. Subsequently, a strobe technique is used by alternately opening and closing the shutter 1220 at intervals of several seconds to track small changes of the WGM spectra. In this way, the frequency shift caused by the transient thermal effects can be separated from shifts caused by a permanent chemical change.

Figure 14A:
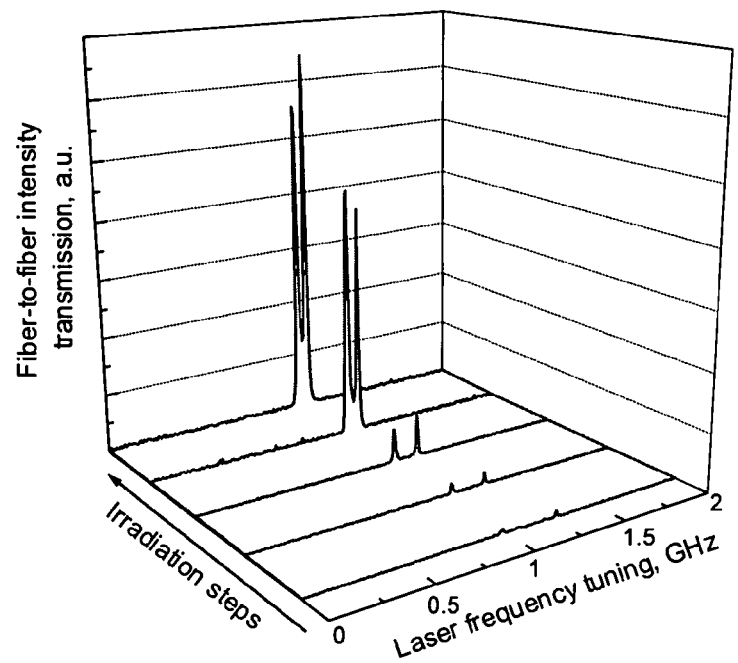
FIGS. 14A and 14B show measured spectral output from a composite filter of one microsphere WGM resonator of pure silica and one torus WGM resonator of Ge-doped silica using the system in FIG. 13.
Figure 14B:
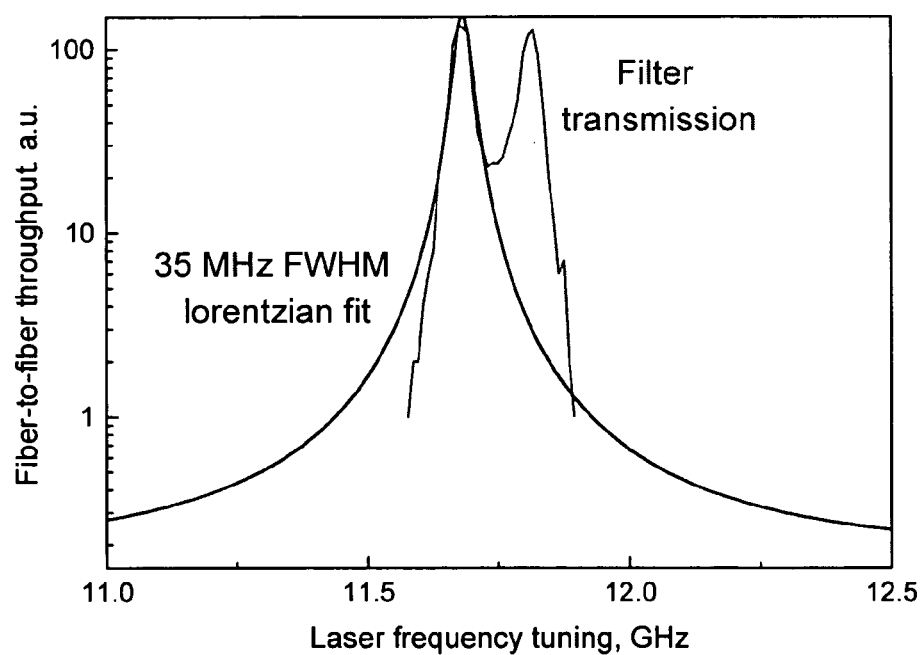

FIG. 14A depicts the final spectrum obtained in a composite filter where the first resonator 1260A is a germanium-doped microtorus and the second resonator 1260B is a pure-silica sphere. To highlight the filter performance, FIG. 14B shows the Lorentzian fit of the curve. This two-cavity composite filter has a much faster rolloff compared with that of the Lorentz line. On the other hand, the filter function of this particular composite filter does not look exactly like a second order filter function in part because of the overcoupling between the resonators.

When the overcoupling is removed, a second order filter function can be achieved. FIG. 6B shows a comparison of the first and second order filter functions. In general, two cascaded WGM resonators produce the following transmission function:

$$|T_{12}|^2 = \frac{\gamma^4}{\gamma^4 + \gamma^2(\omega_1 - \omega_2)^2 + 4(\omega - \omega_1)^2(\omega - \omega_2)^2},$$

where $\gamma$ is the common linewidth of the both resonators, $\omega_1$ and $\omega_2$ the resonance frequencies of the two resonators, respectively. It is assumed that phase shift $\phi$ caused by the coupling satisfies $\exp(i\phi)=-1$.

The above transmission of the composite filter suggests that that the transmission through is small for any frequency when the resonant frequencies of the modes are far from each other ($|\omega_1-\omega_2|^2 >> \gamma^2$). The transmission value has two resonance increases corresponding to the partial resonances of each mode. The transmission becomes close to unity when the mode frequencies are close to each other compared with the modes' width $\gamma$. In addition, the transmission for the off-resonance tuning is inversely proportional to $\gamma^4$, rather than $\gamma^2$ as for a single-resonator, Lorentzian filter. These spectral properties of the second-order filter function can be achieved with two cascaded WGM resonators.

Figure 15A:
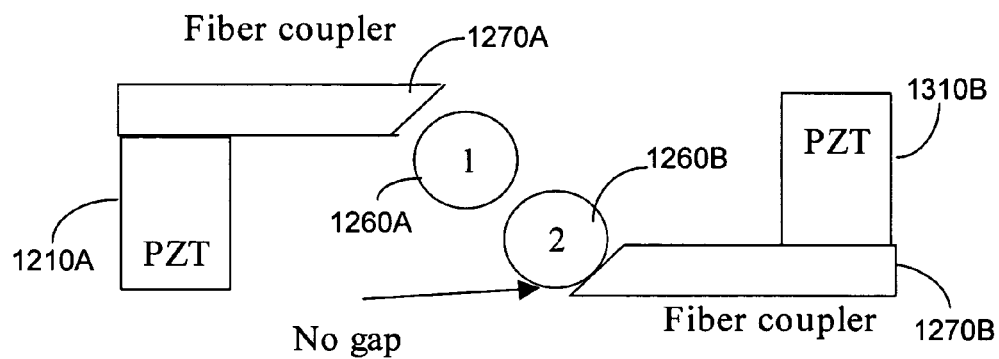
FIGS. 15A and 15B show one particular configuration of the two-resonator system in FIG. 13 and its corresponding spectral output.
Figure 15B:
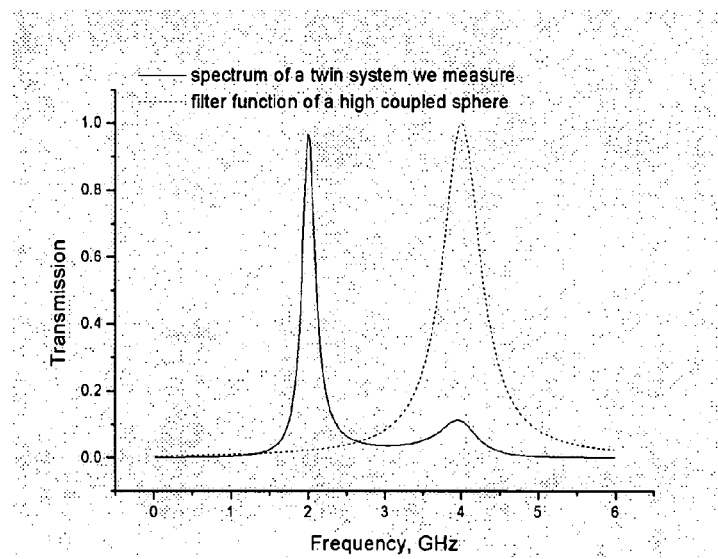
Figure 16A:
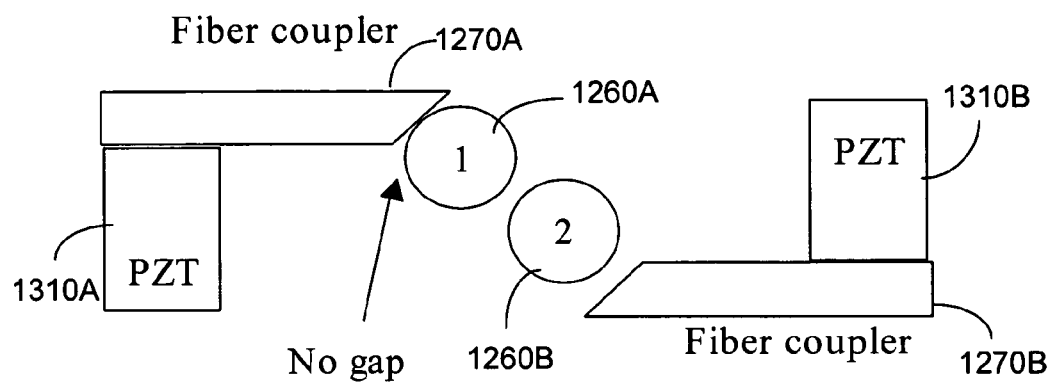
FIGS. 16A and 16B show another particular configuration of the two-resonator system in FIG. 13 and its corresponding spectral output.
Figure 16B:
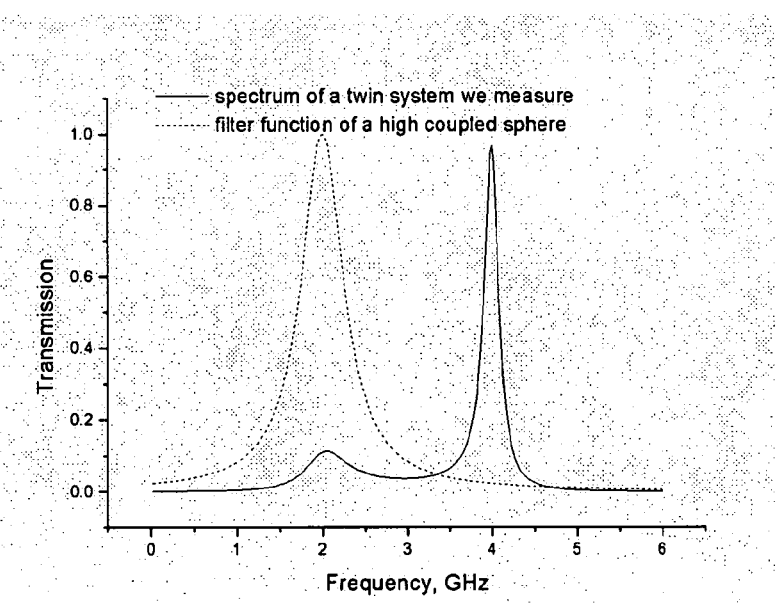

The two-resonator filter system in FIG. 13 may also be configured to monitor the spectrum of either one of the two resonators 1260A and 1260B by modifying the resonator-coupler coupling. FIG. 15A shows that a configuration where the spectrum of the first resonator 1260A is monitored. In this configuration, the first resonator 1260A is weakly coupled to the input coupler 1270A to maintain a high Q factor, e.g., by having a gap whereas the second resonator 1260B is strongly coupled to the output coupler 1270B to achieve a low Q factor, e.g., by being in contact with the coupler 1270B. Hence, the second resonator 1260B and the output coupler 1270B as a combination effectuate as a special output coupler for the resonator 1260A. Accordingly, only the spectrum of the resonator 1260A is shown in the output signal. FIG. 15B illustrates the output spectrum of the two-resonator system under this configuration. Similarly, FIGS. 16A and 16B show another configuration where the spectrum of the second resonator 1260B is monitored.

Referring back to tunable filters shown FIGS. 9A and 9B, either one or both of the WGM resonators 610 and 620 may be made of a radiation-sensitive material to permanently tune their relative spectral properties by exposure to a proper amount of radiation. In operation, at least one of the cascaded resonators is tuned by the control 901 to tune the spectral property of the overall filter. For example, the resonator 610 may be made of an electro-optic material to provide dynamic tuning to the filter 900A after the fabrication is completed and during the normal operation of the filter 900A. The other resonator 620 may be made of Ge-doped silica to allow for permanently tuning of the relative spectral properties of the two resonators 610 and 620 during the fabrication of the filter 900A.

Only a few implementations are disclosed. However, it is understood that variations and enhancements may be made.

What is claimed is:

1. A device, comprising:
    first and second optical resonators each configured to support whispering gallery modes, wherein said first and said second optical resonators are optically coupled to allow for light coupling from a first whispering gallery mode in said first optical resonator to a second whispering gallery mode in said second optical resonator, and
    wherein at least one of said first and said second optical resonators is tunable in response to a control signal to change a property of an optical signal passing through said first and said second optical resonators.

2. The device as in claim 1, wherein said tunable optical resonator includes an electro-optical material and the control signal is an electrical control signal.

3. The device as in claim 2, wherein said tunable optical resonator includes a lithium niobate crystal.

4. The device as in claim 1, wherein said second resonator includes silica.

5. The device as in claim 4, further comprising an optical coupler that is evanescently coupled to said second resonator.

6. The device as in claim 5, wherein said optical coupler is a fiber coupler.

7. The device as in claim 5, wherein said optical coupler includes a waveguide.

8. The device as in claim 5, wherein said optical coupler includes a photonic gap material.

9. The device as in claim 5, wherein said optical coupler includes a prism.

10. The device as in claim 1, wherein both of said first and said second optical resonators are tunable in response to respective control signals to change a property of an optical signal passing through said first and said second optical resonators.

11. The device as in claim 1, wherein each of said first and said second optical resonators includes an electro-optic material.

12. The device as in claim 1, further comprising a third optical resonator configured to support whispering gallery modes, wherein third optical resonator is optically coupled to at least one of said first and said second optical resonators.

13. The device as in claim 12, wherein said third optical resonator is tunable in response to a control signal.

14. The device as in claim 1, wherein one of said first and said second optical resonators is made of at least a part of a spheroid to support whispering-gallery modes circulating along an equator in a circular cross section of said spheroid and around a short ellipsoid axis of said spheroid.

15. The device as in claim 14, wherein said one resonator has a disk shape.

16. The device as in claim 1, wherein one of said first and said second optical resonators is made of at least a part o:E a sphere to support whispering-gallery modes circulating along an equator.

17. The device as in claim 16, wherein said one resonator has a disk shape.

18. The device in claim 1, wherein one of said first and said second optical resonators changes a refractive index after exposure to radiation.

19. The device as in claim 18, wherein said one optical resonator is made of Ge-doped silica.

20. A method, comprising:
    optically coupling first and second optical resonators via evanescent fields in resonance to transmit light through both said first and second optical resonators, each optical resonator supporting whispering gallery modes, at least one of the first and the second optical resonators being dynamically tunable to change optical transmission in response to a control signal; and
    changing the control signal to adjust optical transmission through both said first and second optical resonators.

21. The method as in claim 20, wherein the one of the first and the second optical resonators includes an electro-optic material, and wherein the control signal is an electrical voltage applied to the electro-optic material.

22. The method as in claim 21, wherein the first optical resonator is made of a radiation-sensitive material that changes a refractive index when exposed to radiation and the second optical resonator is made of the electro-optic material.

23. A device, comprising:
    first and second optical resonators each configured to support whispering gallery modes, wherein said first and said second optical resonators are optically coupled to each other in resonance to allow for light coupling from a first whispering gallery mode in said first optical resonator to a second whispering gallery mode in said second optical resonator, and
    wherein said first optical resonator is made of an electro-optic material to be tunable in response to a control signal to change a property of an optical signal passing through said first and said second optical resonators, and wherein said second optical resonator is made of a radiation-sensitive material that changes a refractive index when exposed to sensitizing light at a sensitizing wavelength.

* * * * *